(12) United States Patent
Genise et al.

(10) Patent No.: US 11,560,140 B2
(45) Date of Patent: Jan. 24, 2023

(54) SWITCHABLE POWERTRAIN

(71) Applicant: Eaton Intelligent Power Limited, Dublin (IE)

(72) Inventors: Thomas Alan Genise, Dearborn, MI (US); Payam Naghshtabrizi, Royal Oak, MI (US); Mihai Dorobantu, Richland, MI (US); Chinmaya Patil, South Lyon, MI (US); Mahesh P. Joshi, Pune (IN); Damrongrit Piyabongkarn, Plymouth, MN (US); Erik Dykes, Monroe, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 215 days.

(21) Appl. No.: 17/013,670

(22) Filed: Sep. 7, 2020

(65) Prior Publication Data
US 2021/0070280 A1    Mar. 11, 2021

(30) Foreign Application Priority Data
Sep. 7, 2019  (IN) .............................. 201911036122

(51) Int. Cl.
*B60W 20/40* (2016.01)
*B60K 6/26* (2007.10)
(Continued)

(52) U.S. Cl.
CPC ............... *B60W 20/40* (2013.01); *B60K 6/26* (2013.01); *B60K 6/28* (2013.01); *B60K 6/387* (2013.01);
(Continued)

(58) Field of Classification Search
None
See application file for complete search history.

(56) References Cited

U.S. PATENT DOCUMENTS 8,813,593 B2 * 8/2014 Genise ..................... B60K 6/48
74/333
9,476,461 B2 * 10/2016 Genise .................. F16H 61/688
(Continued)

FOREIGN PATENT DOCUMENTS

DE  102017215673 A1 * 3/2019 ............... B60K 6/36
DE  102017215674 A1 * 3/2019 ............... B60K 6/36
(Continued)

OTHER PUBLICATIONS

European Search Opinion EP 20194850 (Year: 2021).*
European Search Report EP 20194850 (Year: 2021).*

*Primary Examiner* — Dirk Wright
(74) *Attorney, Agent, or Firm* — Squire Patton Boggs (US) LLP

(57) ABSTRACT

A switchable powertrain comprises at least four points of freedom. The switchable powertrain comprises a main gear set configured for gear ratio selection, the main gear set comprising main gears coupled to a main shaft and second gears coupled to a second shaft. An adapter comprises a first selective coupling configured to selectively couple to the main shaft, and a second selective coupling configured to selectively couple to the second shaft. A first torque source and a clutch are configured for selectively coupling or decoupling first torque to the main shaft. A second torque source is configured for selectively outputting second torque to the first selective coupling or to the second selective coupling.

20 Claims, 15 Drawing Sheets

(51) Int. Cl.
  *B60K 6/28* (2007.10)
  *B60K 6/387* (2007.10)
  *B60K 6/547* (2007.10)
  *B60W 10/02* (2006.01)
  *B60W 10/06* (2006.01)
  *B60W 10/08* (2006.01)

(52) U.S. Cl.
  CPC ............ *B60K 6/547* (2013.01); *B60W 10/02* (2013.01); *B60W 10/06* (2013.01); *B60W 10/08* (2013.01)

(56) References Cited

U.S. PATENT DOCUMENTS

| | | | |
|---|---|---|---|
| 2011/0126652 A1 | 6/2011 | Genise et al. | |
| 2011/0303048 A1* | 12/2011 | Genise | ................... B60L 58/18 |
| | | | 903/902 |
| 2015/0298535 A1 | 10/2015 | Luehrs et al. | |
| 2020/0231030 A1 | 7/2020 | Hummel | |

FOREIGN PATENT DOCUMENTS

| | | | | |
|---|---|---|---|---|
| WO | WO-2011064660 A1 | * | 6/2011 | ............... B60K 6/12 |
| WO | WO-2014032961 A | * | 3/2014 | ............. B60K 6/365 |

\* cited by examiner

SWITCHABLE POWERTRAIN

FIELD

This application provides switchable powertrain. A hybrid powertrain can comprise a switchable configuration with four points of freedom.

BACKGROUND

Vocational and line-haul classes of vehicles can be preconfigured differently. For example, the vehicle can be configured to transfer torque from an electric motor to a driveline. The same vehicle can be configured to transfer torque from an engine to a driveline. Such a vehicle can be characterized as a hybrid vehicle ("HEV" or "HV"). The preconfigurations can be related to the average operation speed or the average operation output torque. Typically, there is a single set-point for the preconfiguration with the electric motor and engine handing off along one of two torque transfer pathways. With a set-point for the average operation speed or average operation torque, it is difficult to switch to other operation modes and to then operate the vehicle efficiently. The efficiency and utility of the vehicle is preconfigured rigidly and dissimilar from other classes of vehicle.

SUMMARY

The systems and methods disclosed herein overcome the above disadvantages and improves the art by way of a switchable powertrain comprising at least four points of freedom. There are at least three torque transfer pathways that can be switched among. Energy efficient operation can be achieved in high torque and low torque and high speed and low speed operation modes.

The switchable powertrain comprises a main gear set configured for gear ratio selection, the main gear set comprising main gears coupled to a main shaft and second gears coupled to a second shaft. An adapter comprises a first selective coupling configured to selectively couple to the main shaft, and a second selective coupling configured to selectively couple to the second shaft. A first torque source and a clutch are configured for selectively coupling or decoupling first torque to the main shaft. A second torque source is configured for selectively outputting second torque to the first selective coupling or to the second selective coupling.

Many physical configurations and methods of operation can be implemented, including launch, zero emission operation ("ZEV"), engine cranking, power shifting, coasting, low speed maneuvering such as creep or ultracreep, torque assist, shifting, regeneration, braking, and torque filling. Alternative configurations and methods can be implemented for a powertrain comprising a hybrid adapter. Alternative hybrid adapters can be configured, including a hybrid adapter comprising an internal motor and a hybrid adapter comprising an external motor. Numerous switchable torque transfer systems and methods can be implemented.

An exemplary method of switching the switchable powertrain can comprise switching steps. Implementing a first state where the clutch is decoupled from the main shaft can comprise coupling second torque to the second adapter gears and coupling the second torque from the second adapter gears to the main shaft. Switching from the first state to a second state can comprise terminating outputting second torque from the second torque source and coupling the clutch to the main shaft. The second state can comprise first torque being outputted from the first torque source to the main shaft.

Further alternative configurations and methods can be implemented. A torque transfer system can be configured to switch between a first configuration configured to transfer torque from an electric motor through a transmission and to a driveline and a second configuration configured to transfer torque from an electric motor to the driveline without passing the torque through the transmission. A method of torque filling can comprise running an electric motor to fill in torque gaps caused when a power source is decoupled from a transmission by opening a clutch. A method of starting a vehicle can comprise applying a battery powered motor to a transmission prior to starting an engine. A method of powering auxiliary or off-road features of a vehicle can comprise applying a battery powered motor to a transmission while an engine is decoupled from the transmission. With appropriate control units, various combinations of the disclosed systems and methods can be applied in the alternative in the same vehicle. So, a hybrid adapter can be applied in a powertrain according to more than one alternative method or configuration.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

A switchable powertrain 101, 102, 103, 104 comprises at least four points of freedom. At least three torque transfer pathways can be implemented using the switchable powertrain. The switchable powertrain comprises a main gear set 201, 203, 204 configured for gear ratio selection. Main gear set can also be called a gear box or transmission. Gear shift controller 220 can be mounted to the main gear set 201, 203, 204. Gear shift controller 220 can be configured to communicate with an electronic control unit (ECU) or lever, pedal, button, or other actuator for automated or manual shifting among the various gear ratios offered for selection. Based on the configuration of the main gear set, for example, 5, 6, 10, 12 or 20 gear ratios can be selected, among other numbers of gear ratios, including gear ratios for forward motion and reverse (REV) motion of a main shaft 251, 253, 256. Gear shift controller 220 can connect to various actuators 231-

Figure 1A:
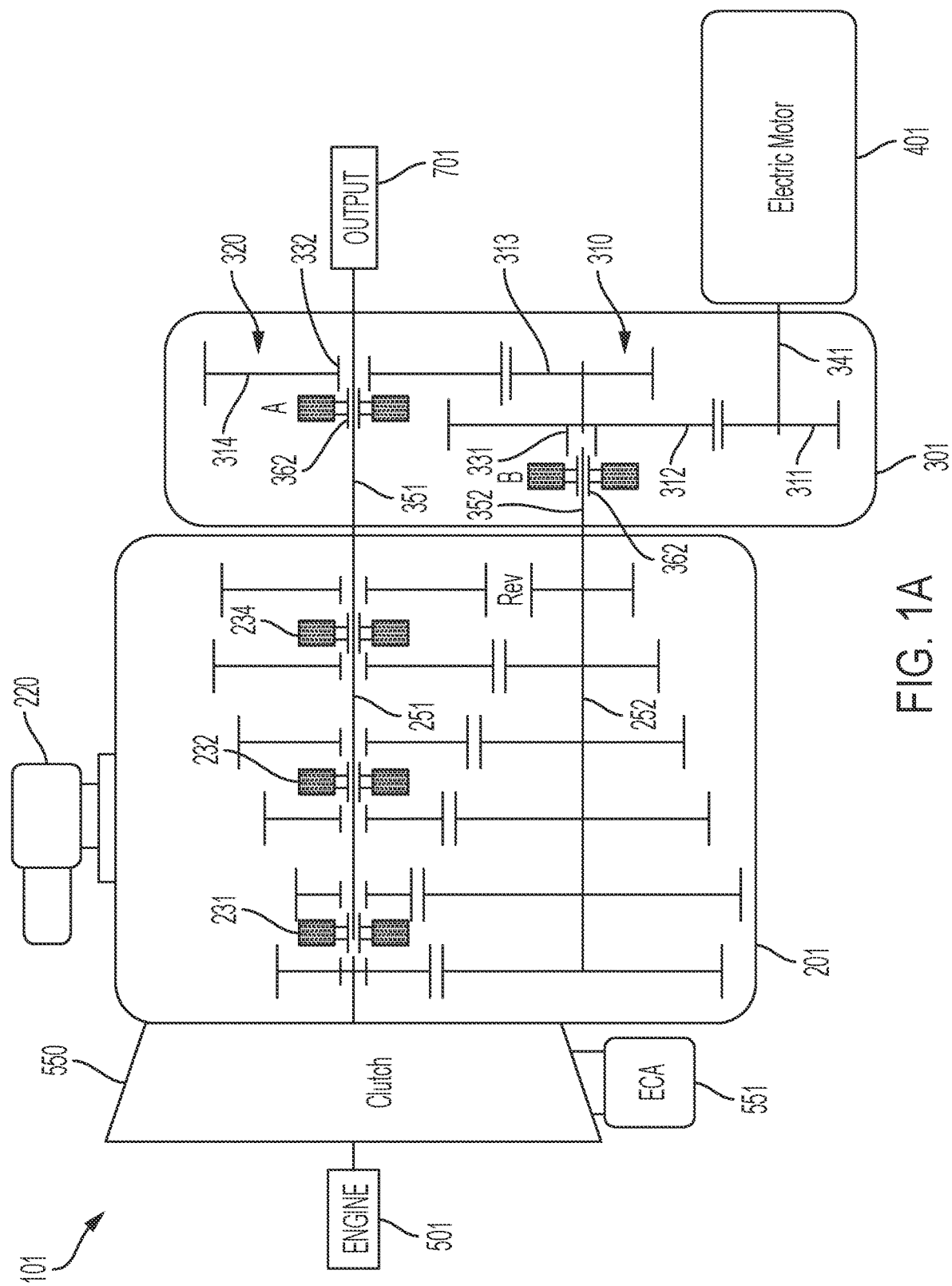
FIGS. 1A-1F are views of a first switchable powertrain.

234, 235-237, 238-240 configured to couple gears of the main gear set to the main shaft 251, 253, 256, second shaft 252, 254, 257, or alternative third shaft 255, 258. Main gear set 201 can constitute a transmission with a single countershaft in the example of FIGS. 1A & 2 or main gear set 203, 204 can constitute a transmission with dual countershafts in the example of FIGS. 3 & 4. Various aspects of connecting the gear shift controller 220 to the actuators 231-240, can be included, such as rods, forks, levers, pneumatics, hydraulics, electronics, among others. The switchable powertrain 101-104 can comprise an automated transmission (AMT) or ENDURANT transmission for land vehicles, and parts therefor manufactured by Eaton Cummins Automated Transmission Tec Limited Liability Company, among other types of transmissions compatible with the teachings herein. Actuators 231-241 can comprise numerous alternatives for selective coupling to main shaft 251, 253, 256, such as splined teeth, dog couplings, clutched discs, pistons, among others. Keyway combinations, other slots, or guides can be fashioned for two or three-way positioning of the actuators such as for on/off positioning or neutral/first position/second position actuation.

Figure 2:
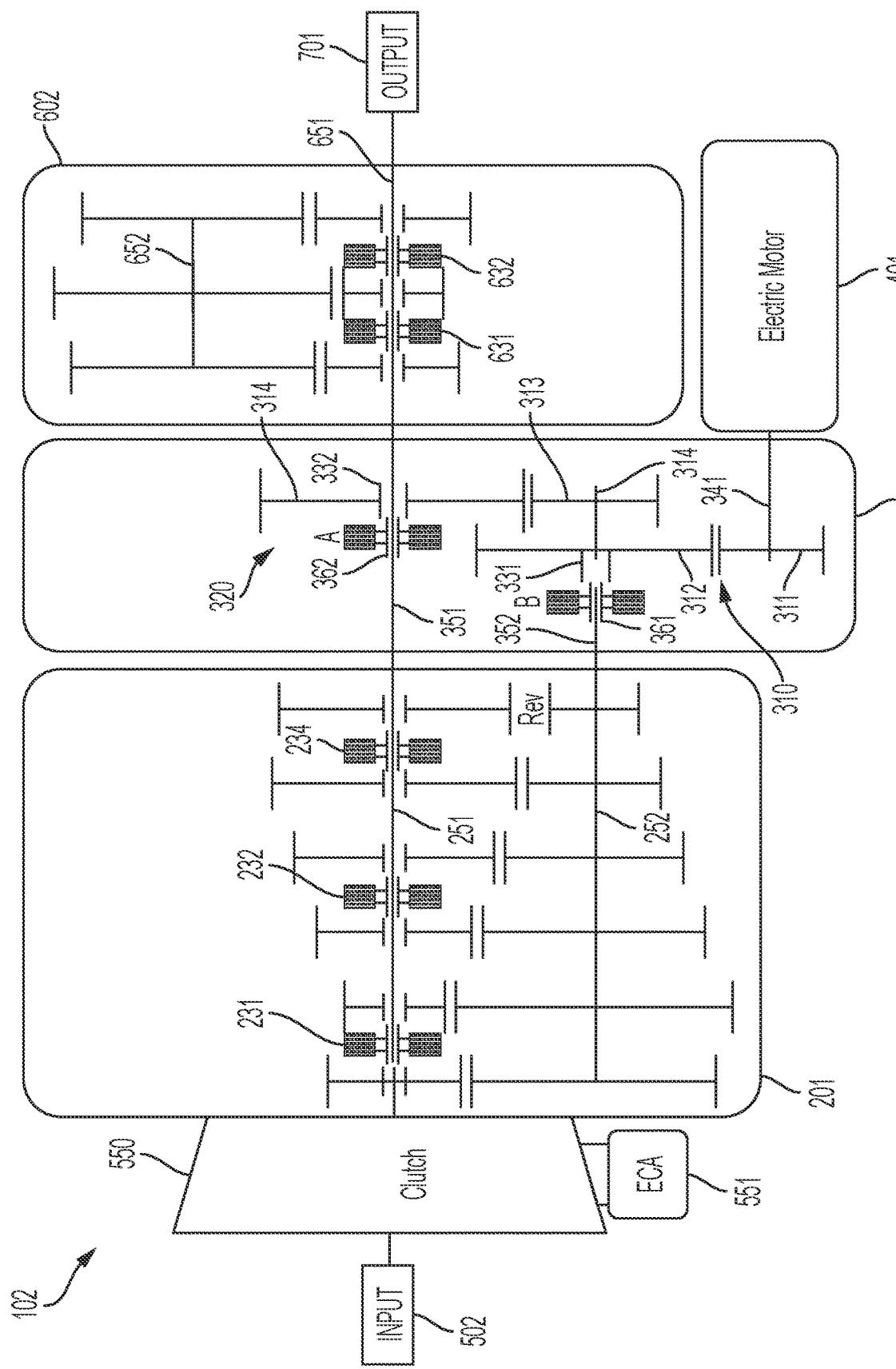
FIG. 2 is a view of an alternative switchable powertrain.
Figure 3:
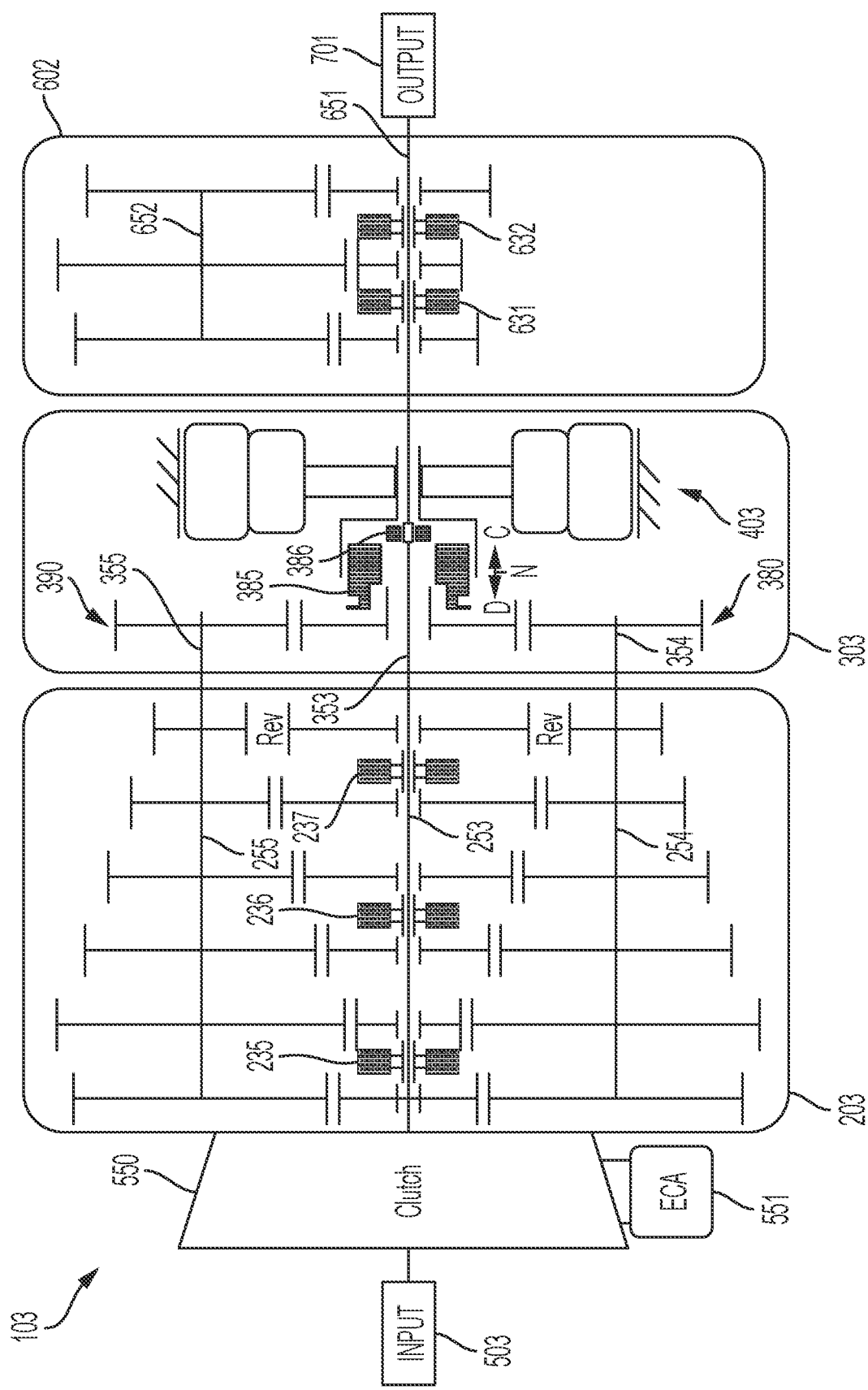
FIG. 3 is a view of another alternative switchable powertrain.
Figure 4A:
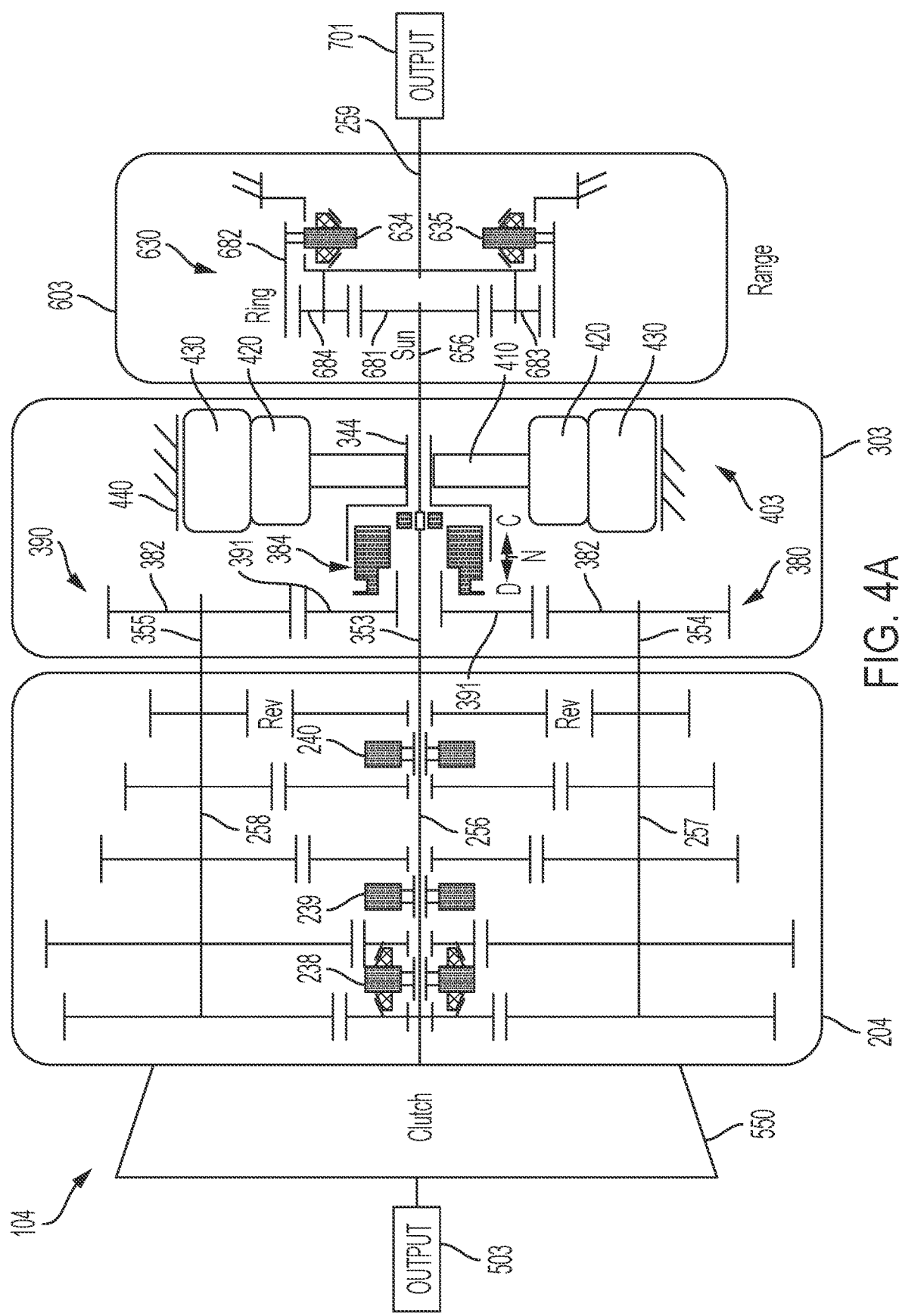
FIGS. 4A-4E are views of another alternative switchable powertrain.
Figure 4B:
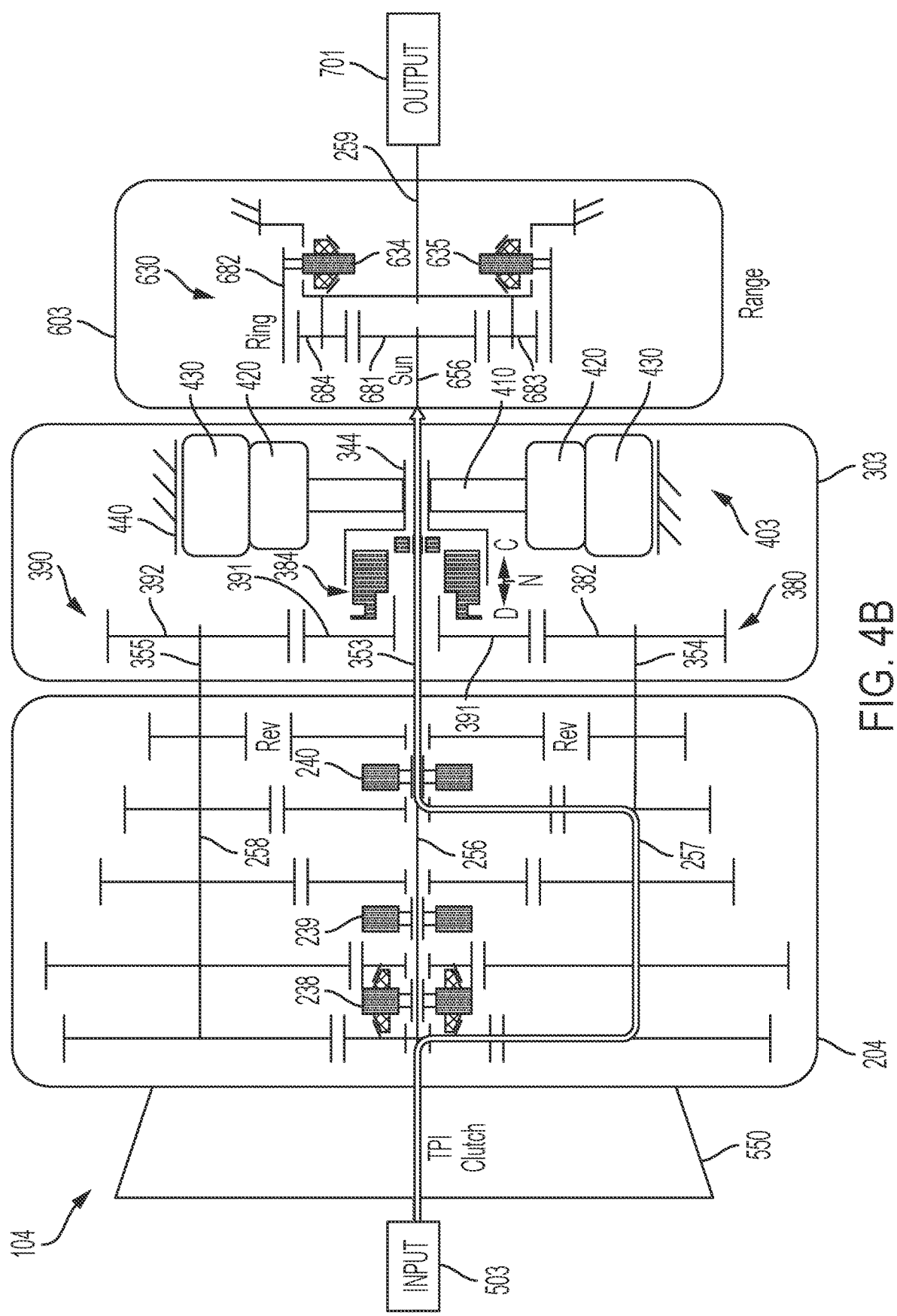

The main gear set 201, 203, 204 comprises main gears coupled to a main shaft 251, 253, 256 and second gears coupled to a second shaft 252, 254, 257. A main gear set 203, 204 comprising third gears coupled to a third shaft 255, 258 can be seen in FIGS. 3 & 4. In FIGS. 1A-3, there are 6 main gears of various size shown in schematic on the main shaft 251, 253. On the second shaft 252, 254, there are 6 second gears of various size configured to mesh with the main gears. In FIG. 4A, there are pairings among 5 gears so that there are 5 main gears on main shaft 256, 5 second gears on second shaft 257, and 5 third gears on third shaft 258. In each main gear set 201, 203, 204, reverse gears REV for reversing the rotation direction of the main shaft 251, 253, 256 have been included. By controlling various actuators 231-234, 235-237, 238-240, the main shaft 251, 253, 256 can be coupled to a selected main gear of a selected size. Gear tooth mating, or meshing, between the main gear and the corresponding second or third gear transfers torque across the mesh of the gears. The selection of the gear pairings via the actuators controls the step up or step down of shaft rotation implemented by the torque applied. Torque can transfer from main shaft 251, 253, 256 to second shaft 252, 254 or from second shaft to main shaft, for example. Torque can transfer from third shaft 255, 258 to main shaft 251, 253, 256 or from main shaft to third shaft, as another example. The torque so transferred can be regenerative torque T3, as when the driveline of a vehicle of a larger device 700 transfers rotational energy back to the electric motor to charge its corresponding battery (i.e. the output 701 becomes an input of torque). Or, the torque can be first torque T1 from the first torque source 501, 502, 503. Or, the torque can be second torque T2 from the second torque source 401, 403.

An adapter 301 can comprise first adapter gears 320 and second adapter gears 310. A first selective coupling A is configured to selectively couple the first adapter gears 320 to the main shaft 251. Adapter 303 comprises a first selective coupling C that can comprise, for example, a three-way shifter 384 configured to selectively couple an adapter coupling 385 to a shaft coupling 386. Now, main shaft 253, 256 is coupled to first selective coupling C. The adapter 303 comprising a three-way shifter 384 can couple to the second torque source 403 to selectively couple to the first selective coupling C, the second selective coupling D, or a neutral position N.

The switchable powertrain 101, 102 can comprise the first selective coupling A comprising a first adapter gear 314. The second selective coupling B can comprise second adapter gears 311, 312, 313. The first adapter gears can be meshed with the second adapter gears.

A second selective coupling B, D is configured to selectively couple the second adapter gears 310, 380 to the second shaft 252, 254, 257. Coupling to main shaft 251, 253, 256 can occur within main gear set 201, 203, 204 via gear mesh and an actuator 231-240 being actuated. For the dual countershaft embodiment, second selective coupling D is further configured to selectively couple third adapter gears 390 to the third shaft 258 via third shaft portion 355. Coupling to the main shaft 253, 256 can occur within main gear set 203, 204 via gear mesh and an actuator 231-240 being actuated. Coupling can also be accomplished via gear mesh in the adapter 303. A third adapter gear 392 at third shaft portion 355 can couple with a first or shared adapter gear 391. Second adapter gears 382 at second shaft portion 354 can also couple with shared adapter gear 391. Shared adapter gear 391 can be coupled and decoupled from three-way shifter 384 as part of second selective coupling D. Adapter coupling 385, able to move to three positions, can couple second torque T2 from second torque source 403 via hub 344 to a corresponding feature on shared adapter gear 391 such as mating splines or dogs features or pistons with clutch plates.

Main shaft 251, 253 can extend from clutch 550 to output 701. In the case of FIGS. 2 & 3, a range gear set 602 is coupled around main shaft portion 651. Range gear set 602 can be coupled to selectively apply a second gear ratio to the main shaft 251, 253. From a location standpoint, the first selective coupling A can be coupled between the range gear set 602 and the main gear set 201 along the main shaft 251, 253.

Range gear set 602 adds additional degrees of freedom by permitting additional gear ratio selection. The range box that can comprise range gear set 602 can comprise additional actuators 631, 632 to couple one of three gears in the alternative to main shaft portion 651, which can also be called a first range shaft. These three gears can be meshed with three additional gears on a second range shaft 652. A HI or LO range gear ratio selection can be selected and applied.

In FIG. 4A, main shaft 256 can extend from clutch 550 to planetary gear system 630 of range gear set 603 (range box). A second main shaft 259 can extend to output 701. The planetary gear system 630 can comprise a sun gear 681, a ring 682, planetary gears 683, 684, and actuators 634, 635. This alternative range gear set 603 enables a HI or LO range gear ratio selection.

Main shaft, second shaft, and third shaft can be unitary or can comprise shaft sections coupled together. So, main shaft portion 351, 353 extending in adapter 301, 303 can be unitary with or a shaft section of main shaft 251, 253, 256. Likewise, second shaft portion 352, 354 can be unitary with or a shaft section of second shaft 252, 254, 257. And so forth for third shaft portion 355 and third shaft 255, 258. A range gear portion 651, 656 of main shaft can be unitary with or a shaft section of main shaft 251, 253, 256 extending in or through range gear set 602, 603.

Output 701 can couple to power a larger device 700 such as a vehicle or other motive device. Larger device 700 can comprise a line-haul or vocational vehicle such as a construction vehicle, off-road vehicle, lifting vehicle, transporter, tractor trailer, bus, delivery truck, hauling among many others. Accessories such as lifts, compressors, mining tools, mixing equipment, among others can be affiliated with the vehicle. Vehicles that need power/torque when stopped can benefit from the switchable powertrain, as the power/torque needs during transport, maneuvering, and stationary work can each be fulfilled. The switchable powertrain can also be used in linehaul vehicles for smooth operation.

A first torque source 501, 502, 503 and a clutch 550 are configured for selectively coupling or decoupling first torque T1 to the main shaft 251, 253, 256. First torque source 501, 502, 503 can comprise an electric motor or a combustion engine. First torque source 501 can comprise a combustion engine such as a diesel engine or gasoline engine. Alternative energy sources can be used. Electric motor can be such as are used in hybrid electric vehicles or other powered devices. First torque source 501, 502, 503 can be tailored for the application of the switchable powertrain. Torque output, rotations per minute of the shaft connected to the clutch 550, among other parameters can be designed for.

Figure 5:
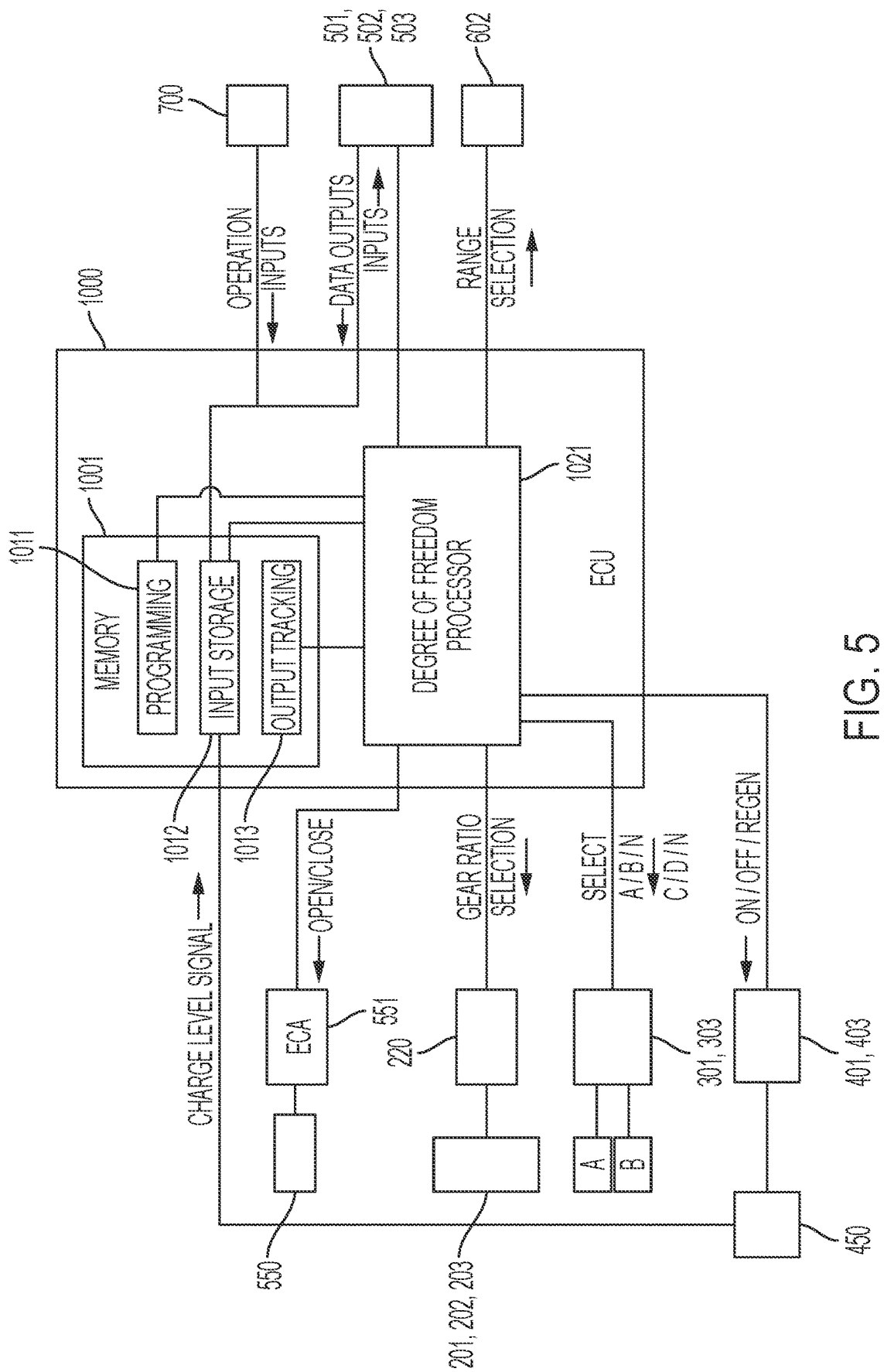
FIG. 5 is a schematic incorporating an electronic control unit.

A second torque source 401, 403 can be configured for selectively outputting second torque T2 to either the first selective coupling A, C or the second selective coupling B, D. Second torque source 401, 403 can output torque to the first adapter gears 320, the second adapter gears 310, 380, and the third adapter gears 390. Second torque source 401, 403 can be an electric motor. It can be one-way powered from a battery 450. Or, it can be bidirectional and can be configured for charging an associated battery. As FIG. 5 shows, the battery 450 can supply a charge level signal to an electronic control unit (ECU) 1000. It can be determined if sufficient battery power is available to power the second torque source 401, 403 by analyzing the charge level signal. Or, a regeneration command can be sent from the ECU 1000. Regeneration can be from other sources in the vehicle such as a regenerative braking system coupled to the battery 450.

An advantage of the adapter 301, 303 is that it can be configured to return torque to the second torque source 401, 403. An electric motor can be coupled to a battery 450. The adapter 301, 303 can be switchable to provide torque to the electric motor to charge the battery 450. A bidirectional electric motor can be configured as a generator. As an example, the electric motor can comprise a casing 440 seating the electric motor inside the adapter 303 or external from the adapter 301. A stator assembly 430 can be braced against the casing 440. A rotor assembly 420 can be positioned to rotate on spindles 410. Spindles 410 can be secured to an axle 341 or hub 344 for rotation of the rotor assembly 420. Numerous alternatives exist for forming the bidirectional device including number of windings, number of electrical phases supported, top rotations per minute, among many others.

ECU 1000 can be partitioned to provide many control aspects to larger device 700. In the case of a vehicle, operation inputs can be received such as accelerator position, forward or reverse command, gear shift request, braking commands, accessory usage, and sensed conditions such as slip, coast, wheel or traction speed among many others. Such operation inputs can be stored in a storage device such as memory 1001 comprising input storage 1012 and operation inputs can be forwarded to a processor such as degree of freedom processor 1021. Algorithms and other programming 1011 can be stored in memory 1001. An output tracking 1013 can be included in memory 1001 for comparative analysis, among other uses. First torque source 501, 502, 503 can output data to input storage 1012 for use in degree of freedom processor 1021. Example output data can include engine rotations per minute, torque capacity, combustion efficiency, crankshaft speed, among others. In the case of another electric motor or motor-generator, output data can comprise rotations per minute of an output shaft, torque capacity, battery life, among others.

Degree of freedom processor 1021 can process stored programming 1011 to determine how to use the degrees of freedom available given the operation inputs from larger device 700. A range selection command can be sent to range gear set (also called a range box) 602, 603 to increase the range of the torque output. An input command can be given to the first torque source 501, 502, 503 to increase or decrease rotations per minute or to turn the first torque source on or off. In synchrony, and in the case of a combustion engine, the clutch 550 can be opened or closed via a command to the clutch 550 or affiliated electronic clutch actuator (ECA) 551. As another degree of freedom, the use of the main gear set 201, 203, 204 can be determined. A gear selection ratio command can be sent to gear shift controller 220 which can in turn actuate the actuators 231-240 to select the corresponding gear ratio. With the adapter 301, 303 as another degree of freedom, a selection command can be sent to activate the first selective coupling A or C, the second selective coupling B or D, or the neutral position N. In the case of adapter 301, adapter actuator 362 can slide from a neutral position N to a position engaged with gear coupling 332 to activate the first selective coupling A. The adapter actuator 361 can slide from a neutral position N to a position engaged with gear coupling 331 to activate second selective coupling B. In the case of adapter 303, a three-way shifter 384 can slide among a neutral position N, a position engaging first selective coupling C, and a position engaging second selective coupling D. Alternatives can comprise clutch, piston, disc, spline, or other mechanisms for shifting among the three positions. Being close to the rotor 420 and stator 430, it is possible to arrange electromagnetic forces to move the three-way shifter 384 so that it moves automatically based on signal strength.

Main gear set 203, 204 can be a twin countershaft design transmission such as an ENDURANT transmission for land vehicles, and parts therefor manufactured by Eaton Cummins Automated Transmission Tec Limited Liability Company. Three-way shifter 384 can engage shared adapter gear 391 in such a way that adapter gear 392 meshes and can transfer second transfer second torque T2 to third shaft portion 355 affixed to adapter gear 392.

Figure 1B:
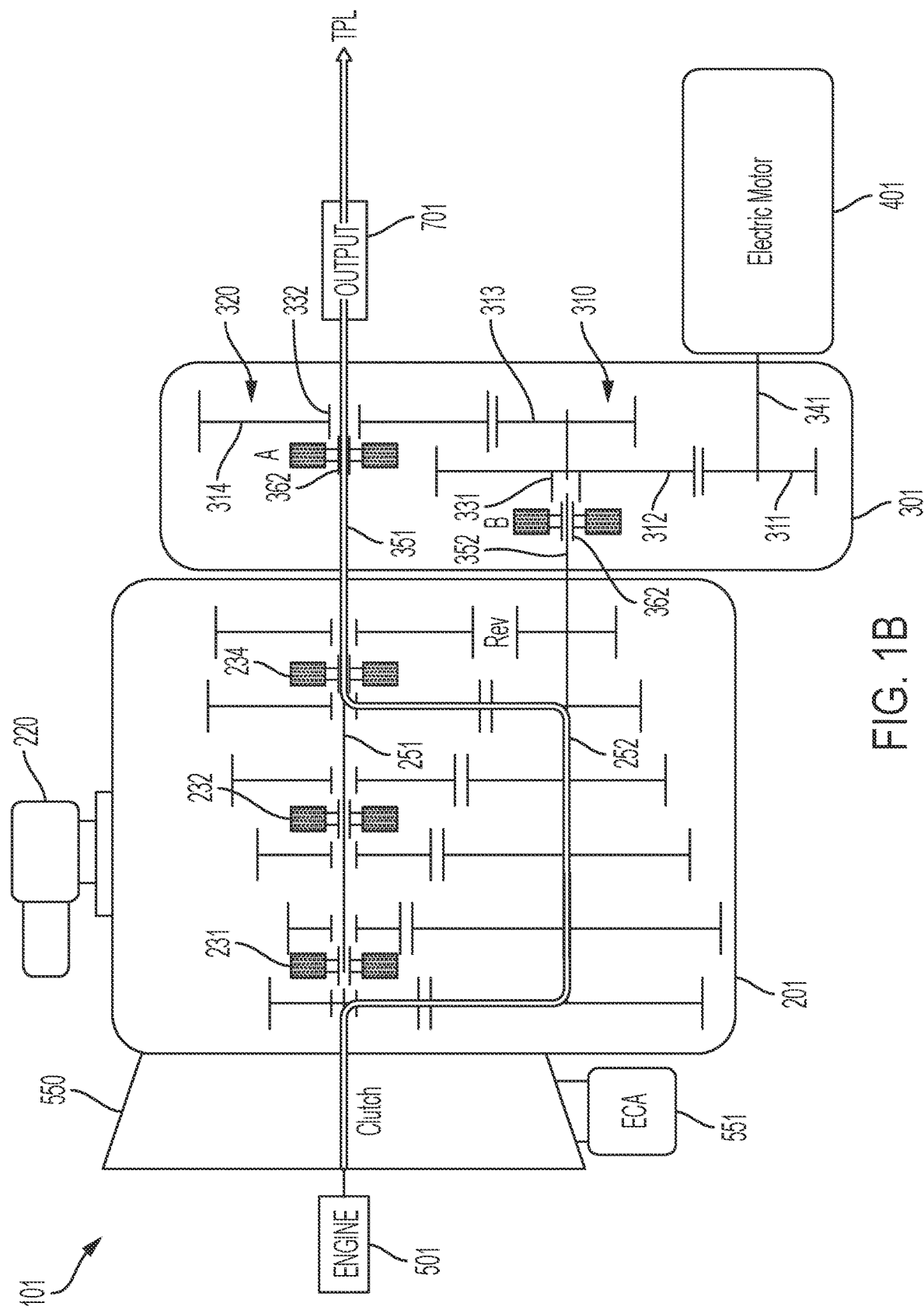
Figure 1C:
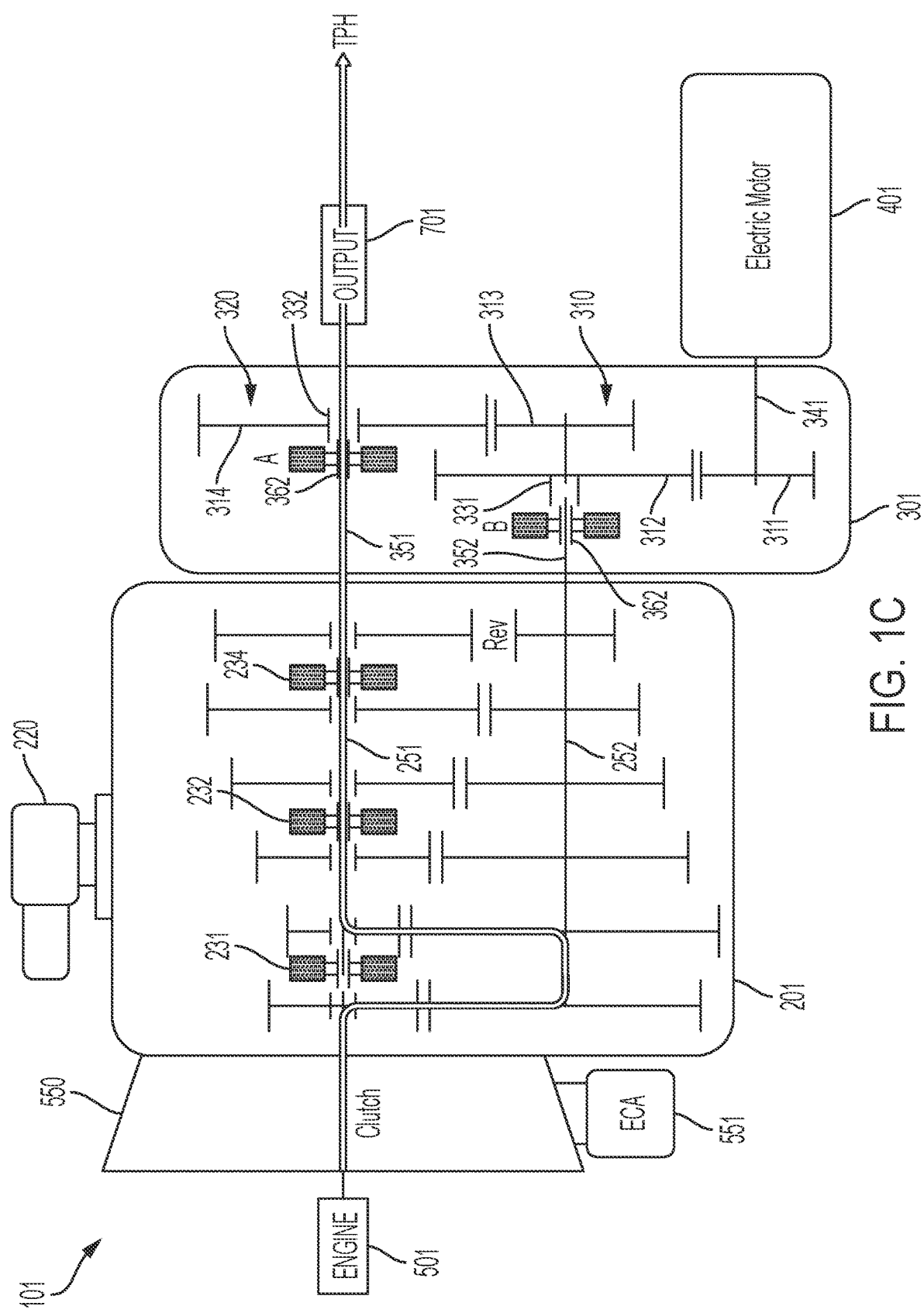

Turning to FIGS. 1B-1E, the torque transfer pathways can be seen for the switchable powertrain in thick arrows. In FIG. 1B, a first torque pathway for first torque T1 from the first torque source 501, through the clutch 550, through the main gear set 201, and out the main shaft 251 to the output 701 can be seen. The first torque T1 can be acted on to vary its quantity by increasing or decreasing engine speed, changing gear ratio in the main gear set 201 or drawing on it in the larger device 700 as part of output 701. In FIG. 1B, the first torque pathway passes through the adapter 301 but is not acted on by the adapter 301. The adapter 301 is a pass-through device in this operation state. This operation state can be a key-on operation state, a drive operation state, or a second operation state implemented after a first spin-up operation state. The gear ratio selections shown are for purposes of example, only. For example, the first torque pathway of FIG. 1B can be for a low speed drive condition, such as a 3 to 4 mile per hour (MPH) maneuver. The low speed can make the first torque pathway a Low Torque Pathway TPL. But, FIG. 1C can be for a higher speed drive condition, such as a 40 MPH cruise condition. This can make the first torque pathway a High Torque Pathway TPH.

Figure 1D:
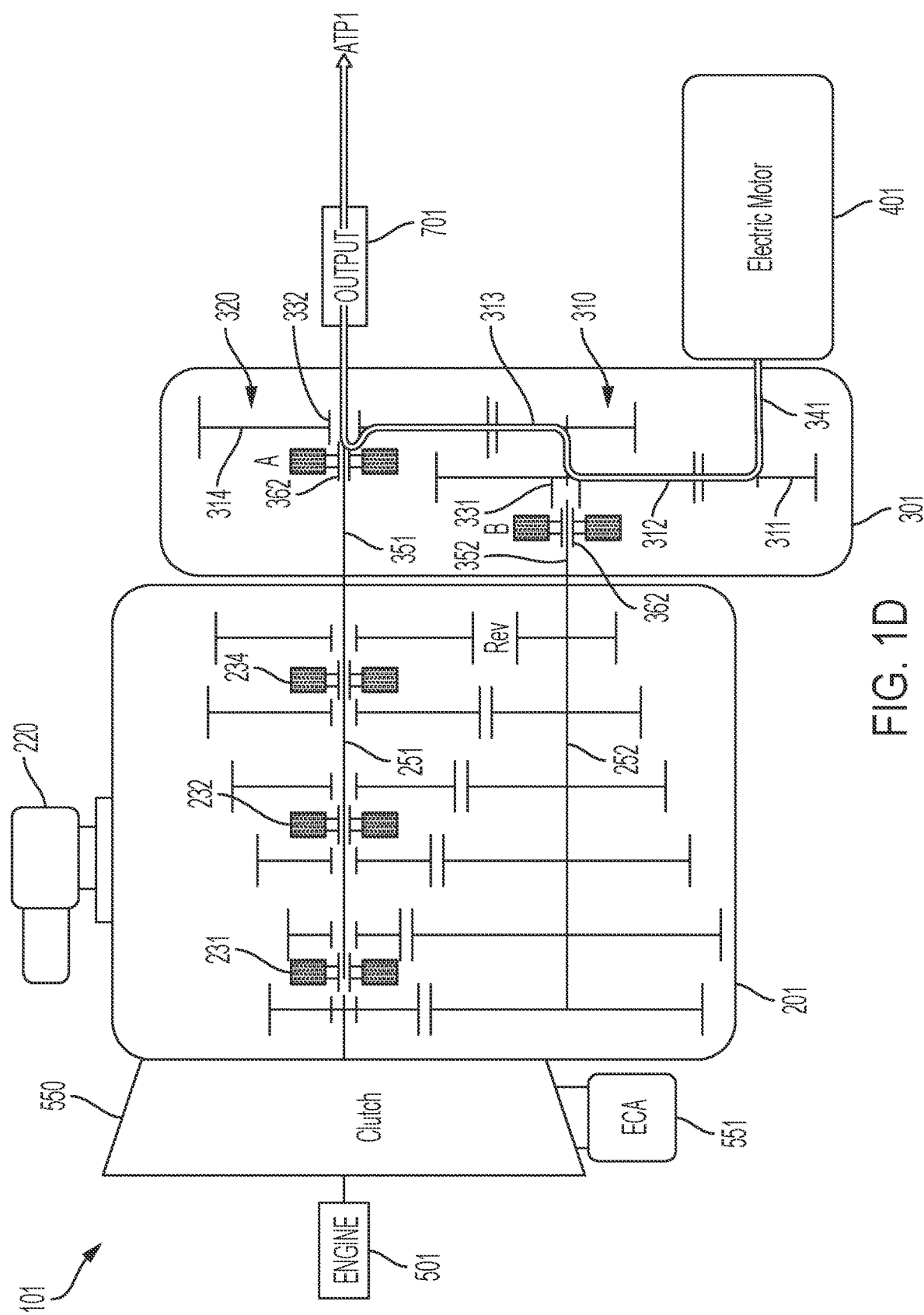

Turning to FIG. 1D, a first adapter torque transfer pathway ATP1 from the second torque source 401, through a mesh of adapter gears 311, 312, 313, and gear shaft 314, through the adapter actuator 362 of first selective coupling A, and out the main shaft portion 351 can be seen. Such a pathway can be used during drive conditions for purposes such as torque filling during powershifts and for continuous regenerative braking. It can be possible to use this pathway at the same time that the clutch 550 is coupled to the first torque source 501 thus permitting addition of first torque T1 and second torque T2. By way of example, this first adapter torque transfer pathway ATP1 can be used when a vehicle is operating from 4 to 40 MPH. This limitation can be due to the maximum speed of the second torque source 401. For example, if the maximum speed is 10,000 rotations per minute, then the second torque source cannot rotate the main shaft enough for output 701. A different gear ratio could be needed to rotate the main shaft enough for output 701.

Figure 1E:
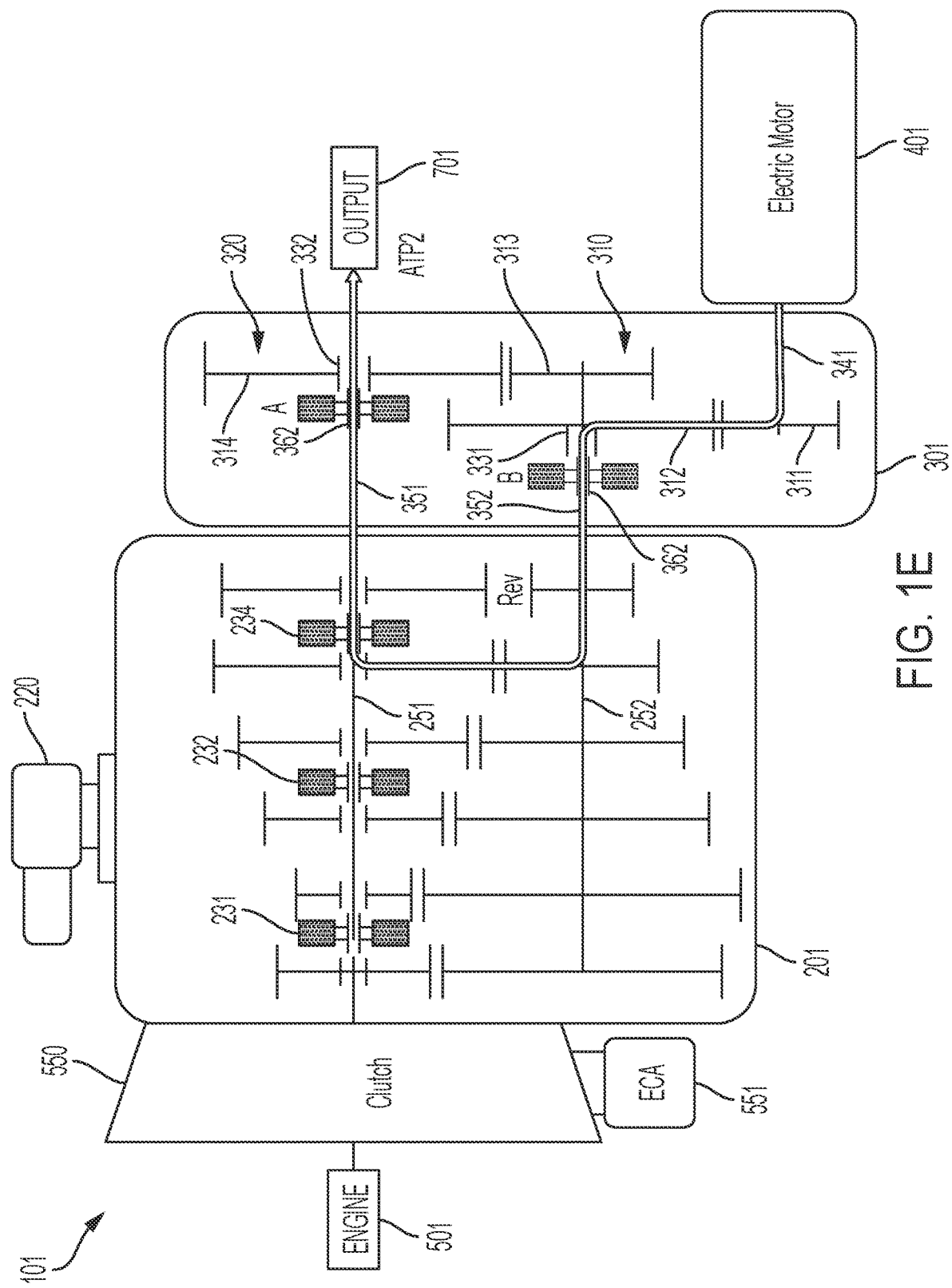
Figure 1F:
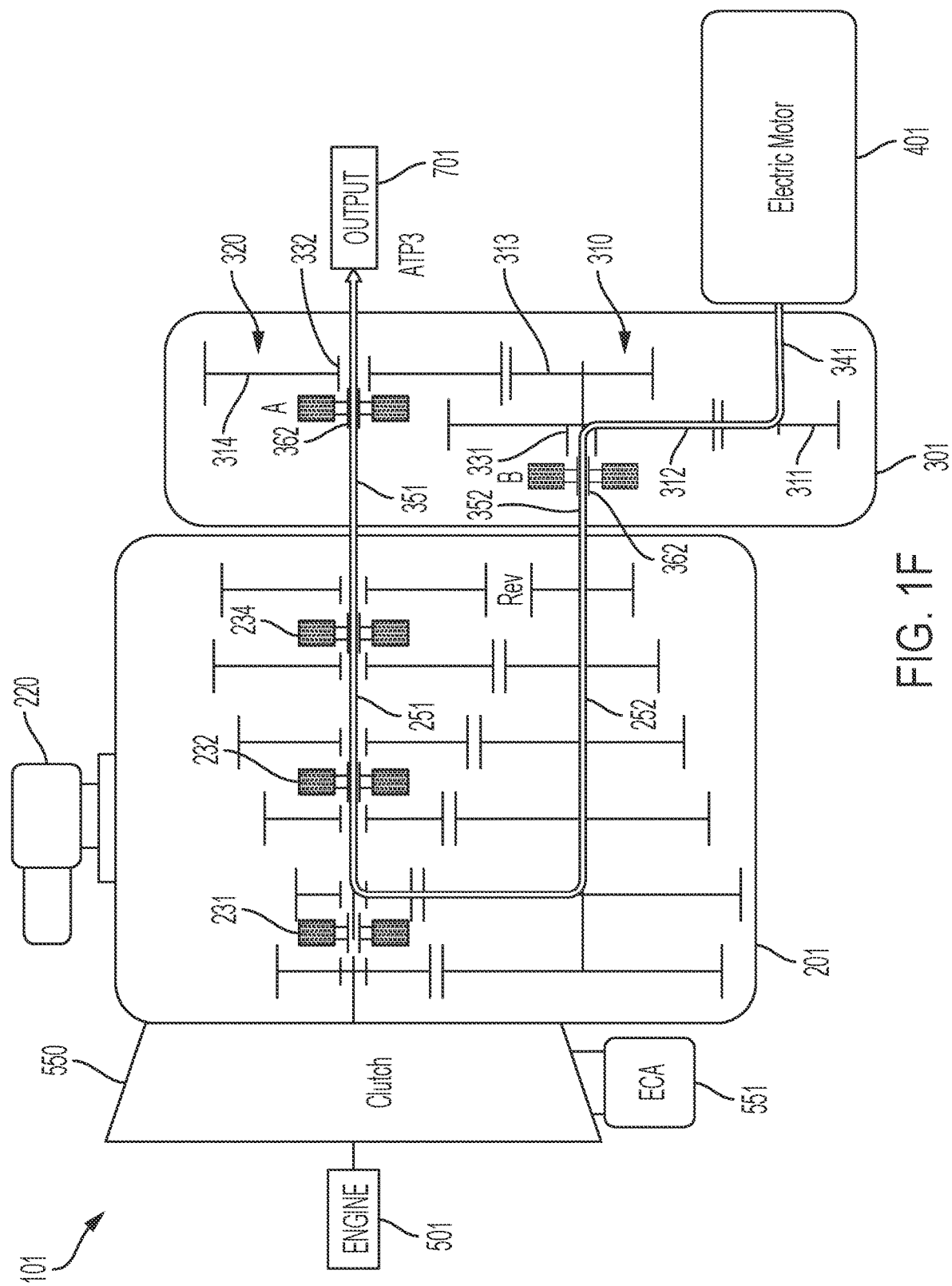

To enable different gear ratios than the first adapter torque transfer pathway ATP1, alternative second and third adapter torque transfer pathways ATP2, ATP3 are shown in FIGS. 1E & 1F. Second torque T2 from the second torque source 401 passes through a second mesh of second adapter gears 311, 312, through the second selective coupling B, through the main gear set 201, and out the main shaft 251. First selective coupling A is switched off or neutral. This second adapter torque transfer pathway ATP2 can be used for purposes such as launching from rest. A slow moving vehicle can begin its initial motions. The second torque source 401 can be applied to spin up the main gear set 201 in preparation for more work. With the main gear set 201 spun up, the first torque path TP1 can be initiated after a key-on event, meaning the first torque source 501, including the engine, can be powered off when second adapter torque transfer pathway ATP2 is used.

The alternative third adapter torque transfer pathway ATP3 is shown in FIG. 1F. This pathway uses a different gear ratio in main gear set 201. This pathway can be used for purposes of cruising at higher vehicle speeds such as 40-60 MPH. The second torque source 401 can output 2500-3600 RPMs, yet the main gear set 201 can translate that to high enough torque to power output 701.

Figure 6:
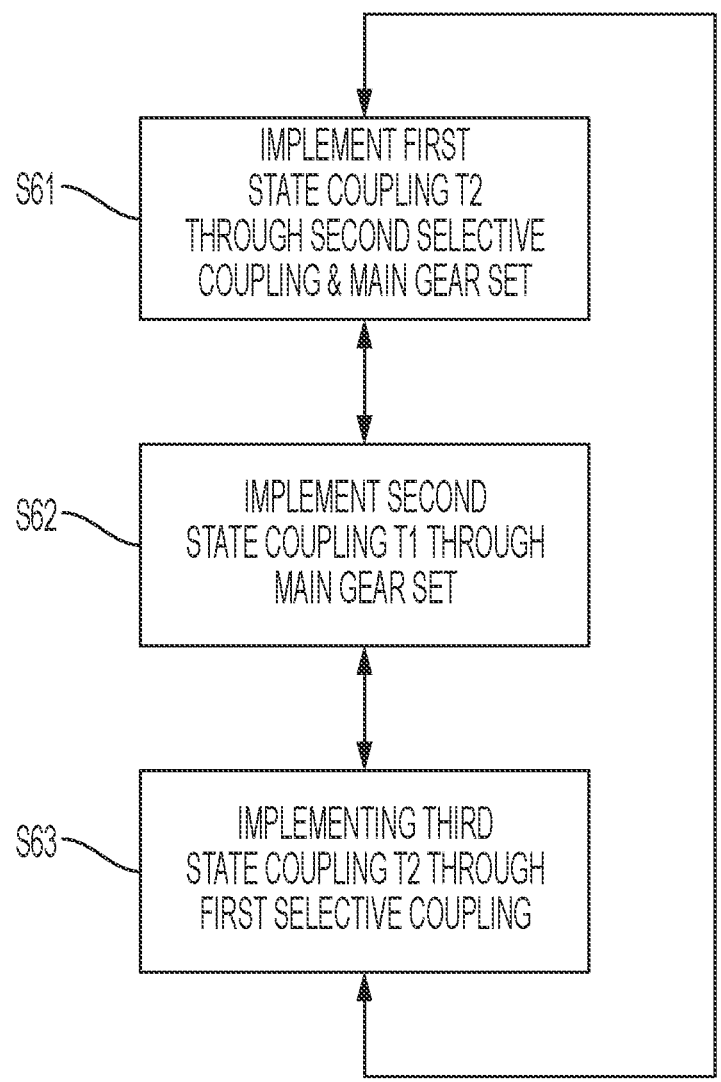
FIG. 6 diagrams a method of operation of the switchable powertrain.

It can be seen from the torque pathways that a vehicle can switch from a stopped or off condition of zero MPH to full highway speed by selecting aspects of the degrees of freedom in the system. FIG. 6 outlines various operational states discussed above for FIGS. 1B-1F. Implementing the first state S61 can launch the vehicle. Implementing the second state S62 can creep the vehicle and start an engine as a first torque source. Implementing the third state S63 can bring the vehicle near cruise and can be alternated with the second state S62. Cruise speeds and above can be accomplished by alternating between all three states, but a ZEV vehicle can comprise switching between the first state S61 and third state S63.

In FIGS. 4B-4E various operation states are outlined. A first torque pathway TP1 from the first torque source 503, through the clutch 500, through the main gear set 204, and out the main shaft 256 can be seen in FIG. 4B. The gear ratio selection is an example, only, and other gear ratios can be selected in the main gear set 204. First torque path TP1 can be used for purposes such as drive or basic vehicle operations.

Figure 4C:
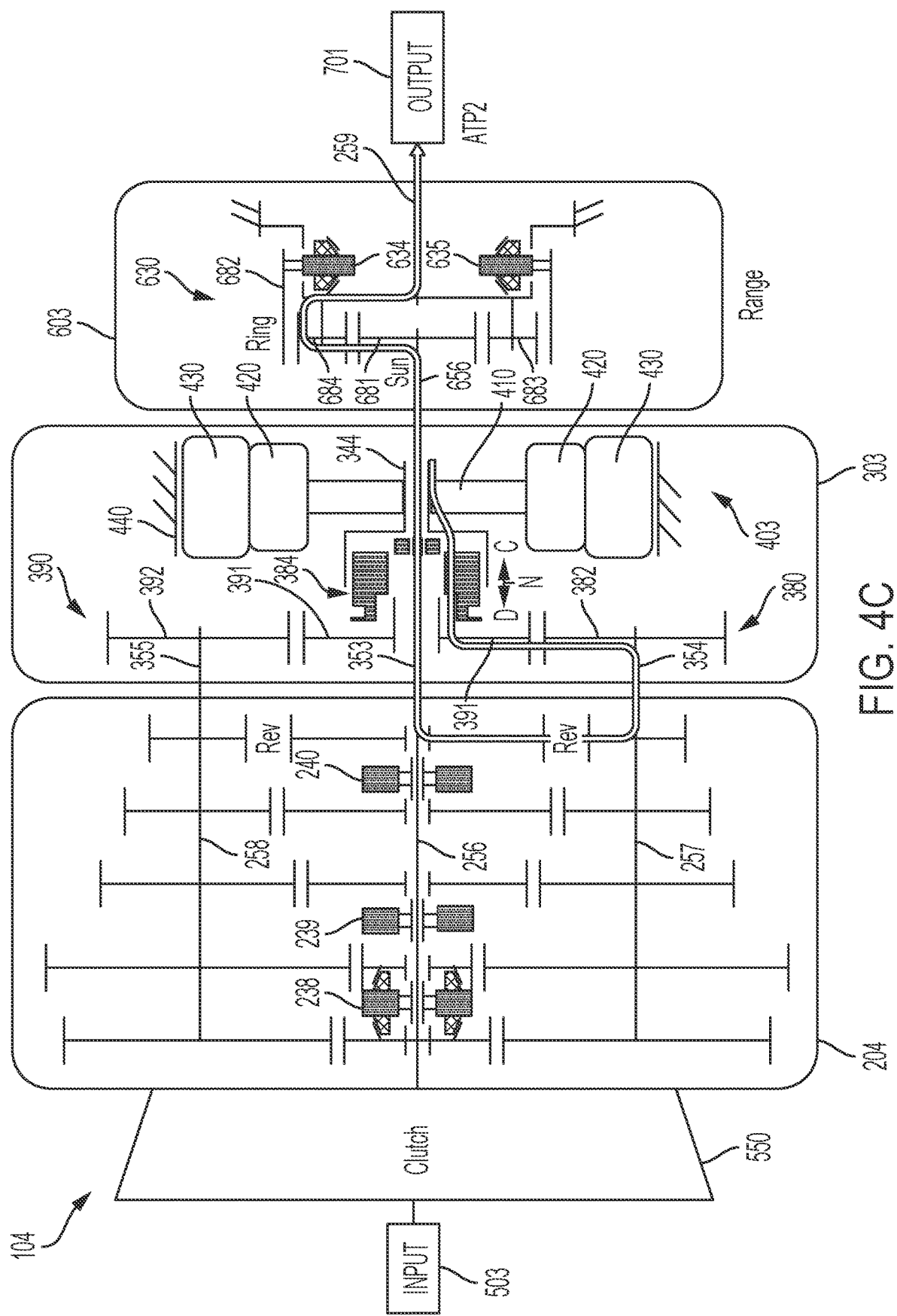
Figure 4D:
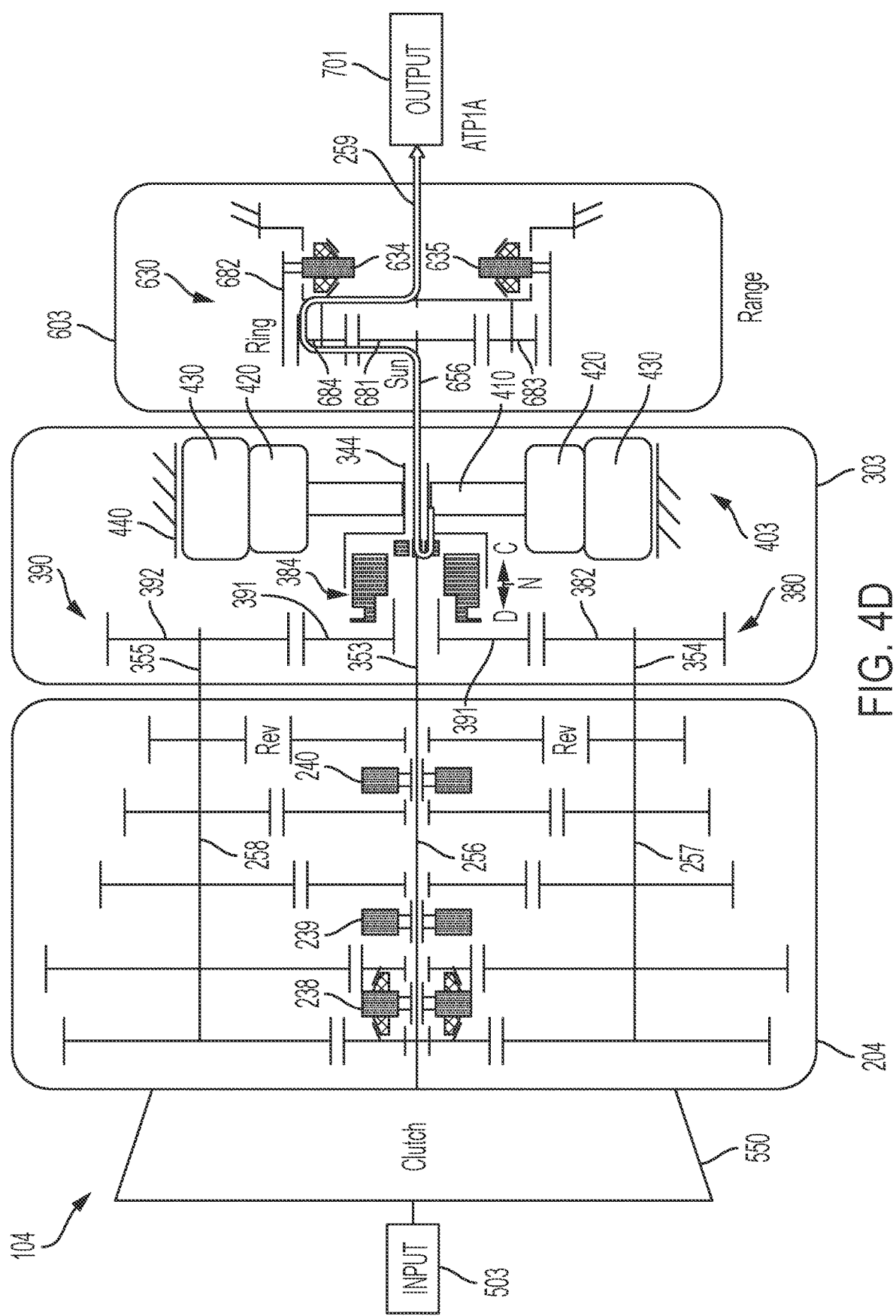
Figure 4E:
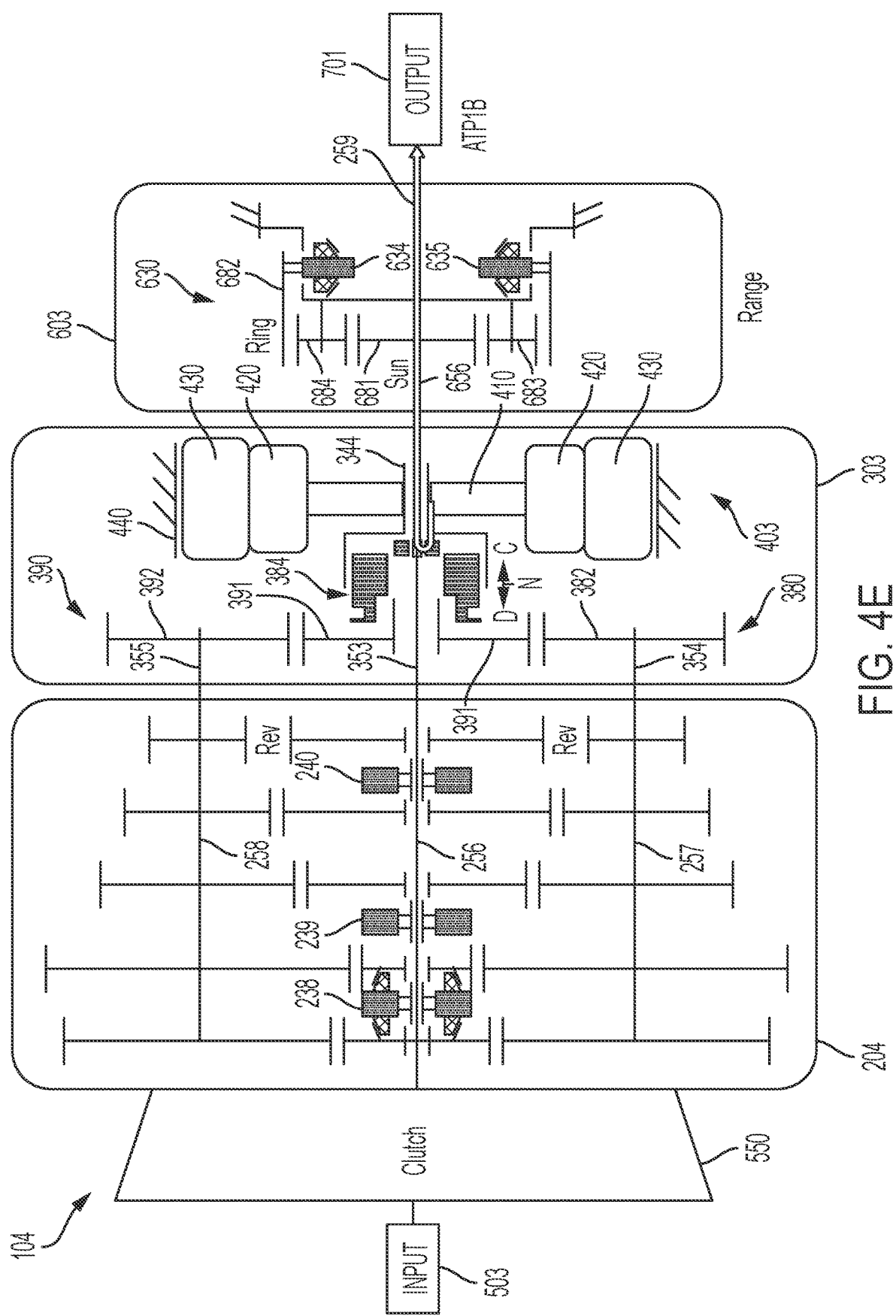

FIGS. 4D & 4E show alternative first adapter torque transfer pathways ATP1A, ATP1B from the second torque source 403, through the three-way shifter 384 of the first selective adapter coupling C, and through the main shaft portion 353 of main shaft 256. Having the range gear set 603 coupled via sun gear 681 and planet gear 684, a range gear ratio is applied. Such a pathway can be used during upshifts as for torque-filling. Acceleration and regeneration can also be accomplished in LO range gears 1-6. In the alternative of FIG. 4E, the range gear ratio is not applied. This alternative first adapter torque transfer pathway ATP1B can also be used during upshifts for torque-filling. But, acceleration and regeneration can be accomplished in HI range gears 7-12. As with FIG. 4D, the effects of the second torque source 403 can be additive such that clutch 550 is closed and first torque source 503 is adding torque to the switchable powertrain 104. And, torque-filling, where the second torque source is used to fill torque gaps when the clutch 550 is open, can be used in both low and high speed operation modes.

A second adapter torque transfer pathway ATP2 can be seen in FIG. 4C. Second adapter torque transfer pathway ATP2 can be from the second torque source 403, through three-way shifter 384 of the second selective coupling D, through a first mesh of adapter gears 391, 382, and out the main shaft 256, including main shaft portion 353. Because range gear set 603 is also coupled, a pathway through the sun and planet gears to output 701 can also be seen. Such a pathway can be used alone or along with first torque pathway TP1 for purposes such as electric launch. The second torque source 403 can spin up the main gear set 204 and range gear set 603 and can begin launching the vehicle. Then, the engine can be started or coupled for additional torque output. First adapter torque transfer pathway ATP1 can also be used with the clutch 550 decoupled (open) for purposes such as electric launch, creep mode, or engine-off driving (zero emission vehicle "ZEV").

Instead of additive torque, the second torque source 401, 403 can be configured to output the second torque T2 to the main shaft 251, 253, 256 when the first torque source 501 is decoupled from the main shaft. That is, the clutch can be commanded open before outputting second torque T2. Or, the second torque source 401, 403 can be used at start-up before there is sufficient power to couple or close the clutch 550. As another example, the second selective coupling B or D is configured to couple to the second shaft 252, 254, 257 when the first torque source 501, 502, 503 is decoupled from the main shaft. In yet another implementation, the second torque source 401, 403 is configured to output the second torque T2 to the second selective coupling B or D when the first torque source 501, 502, 503 is decoupled from the main shaft 251, 253, 256. In yet another alternative, the switchable powertrain is configured so that the first selective coupling A, C is decoupled from the main shaft 251, 253, 256 and the second selective coupling B, D is decoupled from the second shaft 252, 254, 257 when the first torque source 501, 502, 503 is coupled to the main shaft.

In one aspect, the location of the second torque source 401, 403 achieves an advantage in torque coupling efficiency. While it is possible to attach an external motor to a transmission housing to implement the switchable powertrain 101, 102, it is also possible to integrate an electric motor inside the compartment of transmission, as in FIGS. 3 & 4A. In either implementation, the location of the second torque source 401, 403 yields a benefit. So, the switchable powertrain can be configured so that the second gears of the main gear set 201, 203, 204 comprise a range of sizes from a smallest second gear of a smallest second gear size to a largest second gear of a largest second gear size. The second torque source 401, 403 can be coupled in a location nearer to the smallest second gear than the location of the first torque source 501, 502, 503. As yet another implementation, the switchable powertrain can be configured so that the main gears comprise a range of sizes from a smallest main gear of a smallest main gear size to a largest main gear of a largest main gear size. The first torque source can be in a location that is nearer to the smallest main gear than the location of the second torque source 401, 403. Now, each torque source is nearest to the smallest gears to which it will couple. The low speed operations can be especially efficient. And, the main gear set is available to apply a large range of gear ratios to both torque sources.

Said another way, the main shaft 251, 253, 256 and the second shaft 252, 254, 257 are parallel. The first torque source 501, 502, 503 can be configured to selectively couple to or decouple from the main shaft via the clutch 550 on a first end of the main gear set 201, 203, 204. The second torque source 401, 403 can be configured to selectively output second torque to the second shaft via the second selective coupling B, D at a second end of the main gear set 201, 203, 204.

Several methods of switching the switchable powertrains 101-104 have been described. It is additionally possible, commensurate with FIG. 6, to implement additional methods. A first state S61 can be implemented where the clutch 550 is decoupled from the main shaft 251, 253, 256. This can comprise coupling second torque T2 to the second selective coupling B, D and coupling the second torque T2 from the second selective coupling to the main shaft 251, 253, 256 through the main gear set 201, 203, 204. Switching from the first state S61 to a second state S62 can comprise terminating outputting second torque T2 from the second torque source 401, 403. Then, coupling the clutch 550 to the main shaft 251, 253, 256. Lastly, outputting first torque T1 from the first torque source 501, 502, 503 to the main shaft 251, 253, 256. It is also possible to switch between the first state S61, the second state S62, and a third state S63, the third state comprising decoupling the first torque source 501, 502, 503 from the main shaft 251, 253, 256 and coupling the second torque source 401, 403 to the first selective coupling A or C. Then, it is possible to output second torque T2 from the second torque source 401, 403 to the main shaft 251, 253, 256.

The methods herein can further comprise implementing the first state S61 to further comprise spinning up the main gear set 201, 203, 204 by applying the second torque T2 to the main gear set. Implementing the second state S62 can further comprise turning on the first torque source 501, 502, 503.

The methods herein can comprise implementing the first state S61 by terminating outputting first torque T1 from the first torque source 501, 502, 503. Or, switching between the first state S61 and the third state S63 can be accomplished by actuating a three-way shifter 384.

A desired outcome of the methods herein can be accomplished by timing the switching among first state S61, second state S62, and third state S63 so that the main shaft, and therefor the output 701, experiences a constant supply of torque, the constant supply of torque being one or the other of the first torque T1 or the second torque T2.

The switchable powertrain and methods herein enable significant fuel savings through powertrain hybridization, while improving the vehicle drivability, low-speed maneuverability, power gear shifting, electric launch and full electric driving.

A summary of operation modes can be made for the first state S61: vehicle e-launch, ZEV (zero emission vehicle) mode when a vehicle is operated in pure electric vehicle mode within city limits, coast mode, and engine cranking with main clutch engaged & transmission in neutral.

In summary, the third state S63 can be used for power shifting as while changing gear, the motor (second torque source) can be used in peak power to fill the torque hole between shifts. Third state S63 can also be used for coast mode and low speed maneuverability mode when the vehicle needs to move at very slow speed to do certain operations.

More detailed examples and explanations follow to provide working modes for implementing the switchable powertrain 101-104.

A launch assist or electronic launch mode can comprise, when launching the vehicle, the first torque source such as the engine is not cranked and the main clutch is dis-engaged. Then, the vehicle will launch with the second torque source, such as an e-motor, configured to give a smooth start. As a degree of freedom, the second torque source operating parameters can be chosen so that the e-motor has very high torque at low speed. This can be used to launch the vehicle. With the vehicle launched in an electric mode with an e-motor, the clutch life is increased significantly. Once the vehicle attains a certain speed, the engine is cranked and the main clutch is closed to propel the vehicle with an internal combustion engine In certain operations, the vehicle needs to run at very slow speed (0.5 to 2.5 mph) and the driver also needs to have control over speed and torque. These can be in situations such as docking, grading, or maneuvering in tight spaces. In such conditions, the first torque source (engine) is switched off, the clutch 550 is disengaged and the vehicle is propelled with second torque source (electric motor). Creep, ultra creep, and low speed operation modes can be accomplished.

In another mode, it is possible to crank an engine for start-up. The main gear set 201, 203, 204 (transmission) can be put in neutral. The main clutch 550 is engaged & the second torque source (motor) is used to crank the engine by connection through the second selective adapter coupling B or D.

In another mode, a synchronization is made for the engine start. The vehicle is launched with the second torque source (electric motor). The main clutch 550 can be engaged when the vehicle speed is synchronized with first torque source (engine).

In another mode, torque assist and blending can be accomplished. The second torque source (motor) 401, 403 can be used to add torque to wheels coupled to output 701. First torque source 501, 502 503, can be coupled and used when needed. This can be done with first selective coupling A, C engaged. Then, there will not be a transmission-related torque handling limit. With this feature, the first torque source as an engine can be operated at its peak efficiency point. Additional power can be supplied by the second torque source in the form of a motor. Any battery can be charged with regenerating techniques.

An electronic powershift mode can be implemented. When the main gear set 201, 203, 204 as a transmission is shifting gears, the clutch 550 can be dis-engaged. This creates a torque supply hole & reduces the acceleration. In this case, the second torque supply 401, 403 as an electric motor or traction motor can be used at peak power to propel the vehicle while the transmission is shifting gears. This will reduce jerks as well as improve acceleration. This can also be referred to as torque-filling for smoother upshifting.

In an e-generation drive mode, the vehicle will be propelled by first torque source comprising an engine as per a baseline vehicle. If the state of charge (SoC) in the battery goes below a certain level, a charge level signal will trigger the electric machine to be engaged to charge the battery up to a certain percentage.

In coasting modes, such as when a vehicle is going down hill, the first torque source 501, 502, 503 as an engine will be switched off, the main clutch 550 will be dis-engaged, and the vehicle will coast down in top gear. Second torque source 401, 403 as an electric machine will be engaged in an appropriate first or third state S61, S62 to operate the electric machine at an optimum speed. The electric machine can be configured to be regenerative and charge battery 450.

It is possible to implement an electronic-creep (e-creep) mode while using the power take off (PTO). There can be a situation in vocational application, when the vehicle needs to be moved very slowly while the engine PTO needs to run fast. In such a situation, the vehicle can be propelled in an appropriate first or third state S61, S62 with the second torque source 401, 403 as an e-motor. The main clutch can be dis-engaged. And, the first torque source 501, 502, 503 as an engine can be revved up to meet the PTO requirement.

In another mode, braking, retarding, and regeneration can be combined. While a vehicle is going down hill (coasting, braking, etc.), the second torque source as an electronic machine (e-machine) can be used in a generator mode to regenerate energy at the same time that it can act as a retarder to slow down the vehicle. If the vehicle speed increases beyond a certain limit while going down-hill, clutch 550 is engaged and the first torque source as an engine is started to give engine braking. The e-machine can also be used to assist the engine to brake along with the regeneration.

Selection of first state S61 or third state S63 can also be used along with main gear set 201, 203, 204 optimization to maximize regeneration energy. Also, during Engine Off Coasting mode (master clutch 550 open) selection of first state S61 or third state S63 can enable motor gear ratio changes of the second torque source. Then, the master clutch actuator ECA 551 can be controlled to provide negative torque fill to minimize vehicle jerk and to smooth downshifts.

There can be engine-off driving modes. In certain conditions when a vehicle is not allowed to use an internal combustion engine within city limits, the vehicle can be run with the second torque source as an electric motor in pure electric vehicle (EV) mode. In this case, the first torque source as an engine is switched off. The clutch 550 is dis-engaged. The vehicle is propelled in either first or third state S61, S62 based on a torque speed requirement.

Electric vehicle launch mode can be done with first torque source as an engine "off." To (re)start the engine using blended electric power and vehicle inertia, it is possible to coordinate the control of second torque source 401, 403 in the form of a traction motor, master clutch actuator (ECA) 551, and gear shift controller 220 for the selected launch gear of the main gear set 201, 203, 204 as a transmission box. This eliminates the stock starter/alternator from the engine. The peak power capability of the second torque source in the form of an e-machine is used to crank the engine while driving the vehicle.

Low-speed maneuvering modes can also be implemented. It is possible to drive a vehicle fully electric until a certain state-of-charge (SOC) threshold. At that threshold, it is possible to switch to driving with constant engine power from first torque source and keeping the master clutch 550 locked. The second torque source is controlled as speed control device to recharge the battery.

A mode selection for drive can be implemented with a power blend. It is possible to perform an optimization of the 4 degrees of freedom (DOFs) available in the system, namely: first torque source output torque (engine torque), second torque source output torque (motor torque), main gear set ratio (main box ratio), and adapter coupling ratio (motor gear box ratio). This can be done instantaneously using programming 1011 in the ECU 1000 based on operation inputs such as current driver demand. In a more advanced version, the programming 1011 can comprise using a forecast of vehicle duty cycle to optimize the variables over a short horizon and control the degrees of freedom accordingly.

The switchable powertrain can be used to provide a fault-tolerant shift strategy. The shift strategy can adapt to aging and bearing or gear faults. The second torque source as a traction motor can be used to enable skip-shifts during both drive and regeneration. The adapter 301, 303 can be used so as to distribute wear across the main gear set 201, 203, 204. For example, if gear 2 is wearing more than the other gears, the adapter 301, 303 can be controlled to provide electric power from second torque source 401, 403 in lieu of torque transfer from first torque source 501, 502, 503 through the worn gear 2.

The disclosure enables a vehicle to switch between the first state S61 or third state S63 configurations. This deviates from most powertrains that are either configured as first state S61 or third state S63 and are not switchable. Instead of two degrees of freedom (one at the gearbox of the transmission and one at the torque output of the engine), the disclosure provides four degrees of freedom: engine torque, motor torque, main box ratio, motor gear box ratio (P2/P3 mode of hybrid adapter).

In the first state S61, it is possible to combine torque from first torque source (diesel power from engine) with electric power of the second torque source.

In the third state S63, a high torque output can be achieved with the electric power "in front" of the transmission (at the end with the smallest gear). The placement of the electric power enables sufficient torque.

It is possible to switch between first and third states S61 & S63 and to provide torque filling modes seamlessly such that the driver does not feel the switching. This is unlike shudder than can be felt when clutch open or clutch close switching is made without torque filling.

The disclosed switchable powertrain 101-104 is more efficient than powertrains with viscous torque converters because there is no torque loss & there is better fuel economy. But, the performance of constant torque transfer is achieved.

Other implementations will be apparent to those skilled in the art from consideration of the specification and practice of the examples disclosed herein.

What is claimed is:
1. A switchable powertrain, comprising:
a main gear set configured for gear ratio selection, the main gear set comprising main gears coupled to a main shaft and second gears coupled to a second shaft;
an adapter, comprising:
a first selective coupling configured to selectively couple to and decouple from a main shaft portion of the main shaft; and
a second selective coupling configured to selectively couple to and decouple from the second shaft or to or from the first selective coupling;

a first torque source and a clutch configured for selectively coupling or decoupling first torque to the main shaft; and a second torque source configured for selectively outputting second torque to the second selective coupling to form a first adapter torque transfer pathway from the second torque source, through a first mesh of first adapter gears, through to first selective coupling, and out the main shaft portion.

2. The switchable powertrain of claim 1, wherein the second torque source is an electric motor coupled to a battery, and wherein the adapter is switchable to provide torque to the electric motor to charge the battery.

3. The switchable powertrain of claim 1, comprising:
a first torque pathway from the first torque source, through the clutch, through the main gear set, and out the main shaft to the main shaft portion;
the first adapter torque transfer pathway from the second torque source, through the first mesh of first adapter gears, through the first selective coupling, and out the main shaft portion; and
a second adapter torque transfer pathway from the second torque source, through a second mesh of second adapter gears, through the second selective coupling, through the main gear set, and out the main shaft to the main shaft portion.

4. The switchable powertrain of claim 1, wherein the second torque source is configured to output the second torque to the main shaft when the first torque source is decoupled from the main shaft.

5. The switchable powertrain of claim 1, wherein the second selective coupling is configured to couple to the second shaft when the first torque source is decoupled from the main shaft.

6. The switchable powertrain of claim 3, wherein the second torque source is configured to output the second torque to the second adapter gears when the first torque source is decoupled from the main shaft.

7. The switchable powertrain of claim 1, configured so that the first selective coupling is decoupled from the main shaft and the second selective coupling is decoupled from the second shaft when the first torque source is coupled to the main shaft.

8. The switchable powertrain of claim 1, wherein the second gears comprise a range of sizes from a smallest second gear of a smallest second gear size to a largest second gear of a largest second gear size, and wherein the second torque source is nearer to the smallest second gear than the first torque source.

9. The switchable powertrain of claim 8, wherein the main gears comprise a range of sizes from a smallest main gear of a smallest main gear size to a largest main gear of a largest main gear size, and wherein the first torque source is nearer to the smallest main gear than the second torque source.

10. The switchable powertrain of claim 1, wherein the main shaft and the second shaft are parallel, wherein the first torque source selectively couples to or decouples from the main shaft via the clutch on a first end of the main gear set, and wherein the second torque source selectively outputs second torque to the second shaft via the second selective coupling at a second end of the main gear set.

11. The switchable powertrain of claim 1, wherein the first selective coupling comprises first adapter gears, wherein the second selective coupling comprises second adapter gears, and wherein the first adapter gears are meshed with the second adapter gears.

12. The switchable powertrain of claim 1, the adapter further comprising a three-way shifter, wherein the second torque source is coupled to the three-way shifter to selectively couple to the first selective coupling, the second selective coupling, or a neutral position.

13. The switchable powertrain of claim 1, wherein the main gear set further comprises third gears coupled to a third shaft, and wherein the third gears are meshed with the main gears of the main gear set.

14. The switchable powertrain of claim 1, further comprising a range gear set coupled to selectively apply a second gear ratio to the main shaft, wherein the first selective coupling is coupled between the range gear set and the main gear set along the main shaft.

15. A method of switching the switchable powertrain of claim 1, comprising:
implementing a first state where the clutch is decoupled from the main shaft, the implementing comprising:
coupling second torque to the second selective coupling; and
coupling the second torque from the second selective coupling to the main shaft through the main gear set;
switching from the first state to a second state, the second state comprising:
terminating outputting second torque from the second torque source;
coupling the clutch to the main shaft; and
outputting first torque from the first torque source to the main shaft; and
switching between the second state and a third state, the third state comprising:
decoupling the first torque source from the main shaft; and
coupling the second torque source to the first selective coupling; and
outputting second torque from the second torque source to the main shaft portion.

16. The method of claim 15, wherein implementing the first state further comprises spinning up the main gear set by applying the second torque to the main gear set, and wherein implementing the second state further comprises turning on the first torque source.

17. The method of claim 15, wherein implementing the first state further comprises selecting a second adapter torque transfer pathway through a second mesh of second adapter gears, the second adapter coupling, and a main mesh of main gears in the main gear set.

18. The method of claim 15, wherein implementing the first state further comprises terminating outputting first torque from the first torque source.

19. The method of claim 15, further comprising switching between the first state and the third state by actuating a three-way shifter.

20. The method of claim 15, further comprising switching among the first state, the second state, and the third state so that the main shaft experiences a constant supply of torque, the constant supply of torque being one or the other of the first torque or the second torque.

* * * * *